March 11, 1924.
D. M. MORGAN
SPRING BUMPER FOR AUTOMOBILES
Filed Nov. 29, 1922
1,486,446
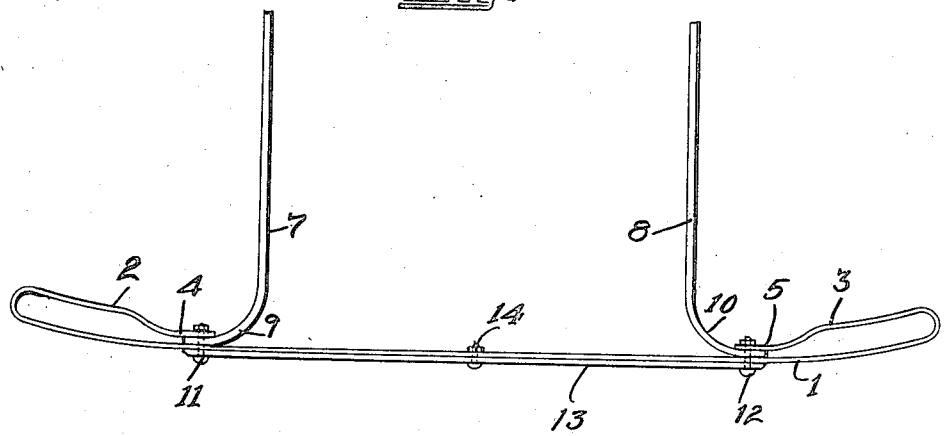
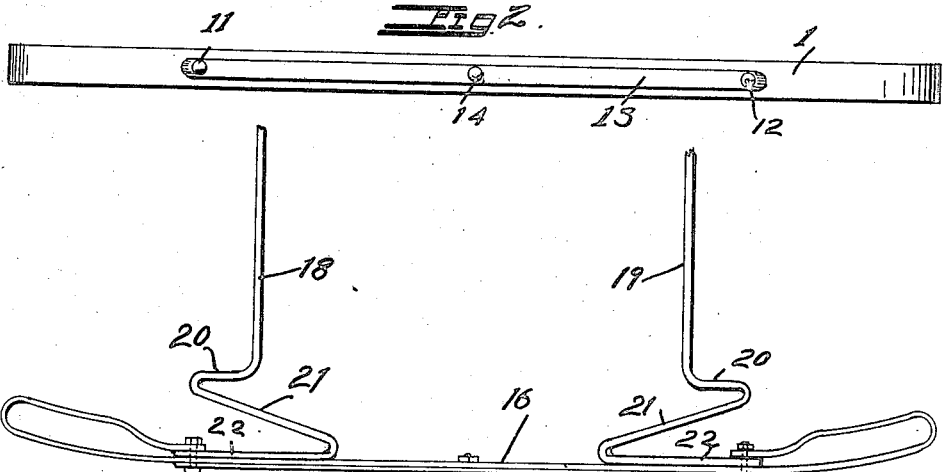
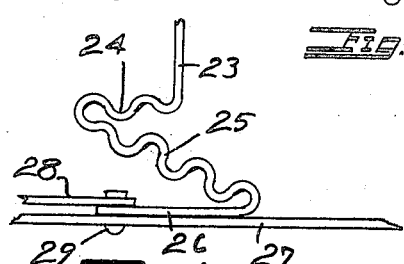
INVENTOR.
David M. Morgan
By
Carlos P. Griffin
ATTORNEY.

Patented Mar. 11, 1924.

1,486,446

UNITED STATES PATENT OFFICE.

DAVID M. MORGAN, OF SAN FRANCISCO, CALIFORNIA.

SPRING BUMPER FOR AUTOMOBILES.

Application filed November 29, 1922. Serial No. 603,961.

*To all whom it may concern:*

Be it known that I, DAVID M. MORGAN, a citizen of the United States, residing at San Francisco, in the county of San Francisco, State of California, have invented a new and useful Spring Bumper for Automobiles, of which the following is a specification in such full and clear terms as will enable those skilled in the art to construct and use the same.

This invention relates to a spring bumper for automobiles, and its object is to provide a bumper which will be sufficiently strong to withstand comparatively heavy shocks, but which will, at the same time, have a sufficiently resilient body to prevent injury to the frame of the automobile, as well as the accessories.

Another object of the invention is to so secure the ends of the bumper as to give them added stiffness where they project beyond the support.

It will be understood by those skilled in the art that most of the injuries to automobiles are due to small collisions with wheels or fenders of other machines where two machines come together at such an angle with respect to each other as to bend only one fender.

With the present bumper the end of the spring extending entirely across the vehicle is secured to the bumper support in such a manner as to stiffen that overhanging end more than enough to compensate for the fact that the extreme outer end is entirely unsupported.

Another object of the invention is to produce a connecting arm for securing the bumper to the frame of the vehicle, which will itself have considerable resiliency in addition to the transverse spring member.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a plan view of the complete bumper,

Fig. 2 is a front elevation of the complete bumper,

Fig. 3 is a plan view of the complete bumper with a modified form of supporting arm for the bumper, and Fig. 4 is a plan view of a still further modified form of bumper supporting arm.

The bumper consists of a flat plate 1, said plate having each end doubled back, as indicated at 2 and 3, and then curved so that its extreme end lies parallel with the front portion of the bumper spring, as indicated at 4 and 5, and separated therefrom by the thickness of the bumper arms 7 and 8.

The bumper arms may be of any suitable form where they connect with the vehicle frame, but their front ends are curved outwardly as indicated at 9 and 10, and they are connected to the bumper spring itself by means of two bolts 11 and 12.

The bumper spring has a reinforcing member 13 secured thereto, a bolt 14 at the center aiding in holding it in place.

In the form of the invention shown in Fig. 3, the bumper spring is substantially like the bumper spring shown in Fig. 1, said spring being indicated at 16, and having the stiffening bar 17 connected thereto.

The arms 18 and 19 are bent to produce a Z, with a short member 20, an inclined member 21 and a longer member 22, in contact with the bumper member 16.

In the form of the invention shown in Fig. 4, the arms for connecting the bumper to the automobile frame are indicated at 23, and there is a corrugated portion 24 extending outwardly, an inclined corrugated portion 25 connecting the portion 24 with the straight portion 26 of the arm. This straight portion is in contact with the bumper spring 27, and the end of said spring is shown at 28 and connected to the arm by means of the bolt 29.

In all forms of the invention it will be seen that any pressure exerted diagonally upon the ends of the bumper spring will tend to move the middle of the bumper away from the body of the vehicle, the bending setting up a shearing moment in the bolts 11 and 12, at the same time this will stiffen the ends of the bumper sufficiently to increase the bumper strength over the strength of a single spring member.

In the form of the invention shown in Figs. 3 and 4, the bumper is especially resilient when struck directly in front or slighly at one side, there being sufficient give in the bracket members 18 and 19 or 23 to prevent serious injury to the vehicle unless struck with sufficient force to completely wreck the entire apparatus.

What I claim is as follows, but various modifications may be made in the construction shown in the drawings and above particularly described form, within the purview of my invention.

A vehicle bumper, comprising a pair of supporting brackets, a transverse bumper member having its ends doubled back thereon, and a bolt passing through the bumper member twice and through each supporting bracket.

In testimony whereof I have hereunto set my hand this 24 day of November A. D. 1922.

DAVID M. MORGAN.